(12) United States Patent  
Lee (10) Patent No.: US 9,771,046 B2  
(45) Date of Patent: Sep. 26, 2017

(54) CURTAIN AIRBAG APPARATUS

(71) Applicant: HYUNDAI MOBIS Co., Ltd., Yongin-si, Gyeonggi-do (KR)

(72) Inventor: Jong Seob Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 26 days.

(21) Appl. No.: 14/881,628

(22) Filed: Oct. 13, 2015

(65) Prior Publication Data

US 2016/0107603 A1 Apr. 21, 2016

(30) Foreign Application Priority Data

Oct. 17, 2014 (KR) .................. 10-2014-0141133

(51) Int. Cl.
| | |
|---|---|
| *B60R 21/233* | (2006.01) |
| *B60R 21/232* | (2011.01) |
| *B60R 21/213* | (2011.01) |
| *B60R 21/239* | (2006.01) |
| *B60R 21/00* | (2006.01) |
| *B60R 21/16* | (2006.01) |

(52) U.S. Cl.
CPC .......... *B60R 21/233* (2013.01); *B60R 21/213* (2013.01); *B60R 21/232* (2013.01); *B60R 21/239* (2013.01); *B60R 2021/0009* (2013.01); *B60R 2021/0023* (2013.01); *B60R 2021/0048* (2013.01); *B60R 2021/161* (2013.01); *B60R 2021/23308* (2013.01)

(58) Field of Classification Search
CPC ... B60R 21/233; B60R 21/239; B60R 21/213; B60R 21/232; B60R 2021/23308; B60R 2021/0009; B60R 2021/0048; B60R 2021/0023; B60R 2021/161

See application file for complete search history.

(56) References Cited

U.S. PATENT DOCUMENTS

| | | | | |
|---|---|---|---|---|
| 6,065,772 A | * | 5/2000 | Yamamoto | B60R 21/207 280/730.2 |
| 6,073,960 A | * | 6/2000 | Viano | B60R 21/231 280/730.1 |

(Continued)

FOREIGN PATENT DOCUMENTS

| | | |
|---|---|---|
| JP | 2012-096780 A | 5/2012 |
| WO | WO 2012/111073 A1 | 8/2012 |

OTHER PUBLICATIONS

Aug. 30, 2016, Japanese Office Action for related JP application No. 2015-196970.

*Primary Examiner* — Paul N Dickson  
*Assistant Examiner* — Timothy Wilhelm  
(74) *Attorney, Agent, or Firm* — Paratus Law Group, PLLC (57) ABSTRACT

Provided is a curtain airbag apparatus capable of preventing a head of an occupant from being moved forward at the time of an oblique collision of the vehicle. To this end, a curtain airbag apparatus according to an exemplary embodiment of the present invention includes: an auxiliary airbag which is coupled to the curtain airbag, is inflated when gas flows into the auxiliary airbag, and protrudes into the interior of a vehicle; and a support panel which is coupled to the curtain airbag and the auxiliary airbag, and supports the protruding auxiliary airbag.

13 Claims, 5 Drawing Sheets

(56) References Cited

U.S. PATENT DOCUMENTS

| | | | | |
|---|---|---|---|---|
| 6,851,706 B2* | 2/2005 | Roberts | B60R 21/23138 | 280/730.1 |
| 7,278,655 B2* | 10/2007 | Inoue | B60R 21/2342 | 280/730.2 |
| 7,549,672 B2* | 6/2009 | Sato | B60R 21/207 | 280/729 |
| 7,712,768 B2* | 5/2010 | Fukuda | B60R 21/232 | 280/729 |
| 7,784,823 B2* | 8/2010 | Heigl | B60R 21/213 | 280/730.2 |
| 7,988,187 B2* | 8/2011 | Yamamura | B60R 21/232 | 280/730.2 |
| 8,282,124 B2* | 10/2012 | Trovato | B60R 21/232 | 280/730.2 |
| 8,282,125 B2* | 10/2012 | Pinsenschaum | B60R 21/232 | 280/730.2 |
| 8,622,420 B2* | 1/2014 | Kato | B60R 21/0136 | 280/730.2 |
| 8,851,508 B1* | 10/2014 | Rickenbach | B60R 21/232 | 280/729 |
| 8,876,153 B2* | 11/2014 | Dix | B60R 21/233 | 280/729 |
| 8,894,094 B2* | 11/2014 | Wang | B60R 21/232 | 280/730.2 |
| 8,967,660 B2* | 3/2015 | Taguchi | B60R 21/233 | 280/729 |
| 9,067,563 B2* | 6/2015 | Okuhara | B60R 21/2338 | |
| 9,114,776 B2* | 8/2015 | Thomas | B60R 21/2338 | |
| 9,254,803 B2* | 2/2016 | Park | B60R 21/0132 | |
| 2014/0203541 A1* | 7/2014 | Wei | B60R 21/213 | 280/730.2 |
| 2015/0166002 A1* | 6/2015 | Fukawatase | B60R 21/233 | 280/730.1 |
| 2015/0307057 A1* | 10/2015 | Moon | B60R 21/232 | 280/728.2 |

* cited by examiner

CURTAIN AIRBAG APPARATUS

CROSS-REFERENCE TO RELATED APPLICATIONS

The present application claims priority to Korean Patent Application Number 10-2014-0141133 filed Oct. 17, 2014, the entire contents of which the application is incorporated herein for all purposes by this reference.

TECHNICAL FIELD

The present invention relates to a curtain airbag apparatus, and more particularly, to a curtain airbag apparatus that is installed to be elongated in a front and rear direction of a vehicle.

BACKGROUND

In general, curtain airbags are installed at left and right sides of a vehicle, respectively. In more detail, the curtain airbag is installed on a side inner panel, which is disposed at an upper side of a lateral side of the vehicle, so as to be elongated in a front and rear direction of the vehicle.

The curtain airbag is deployed from the upper side to the lower side at the time of an accident of the vehicle, and disposed between a door of the vehicle and a head of an occupant to protect the head of the occupant.

Figure 1:
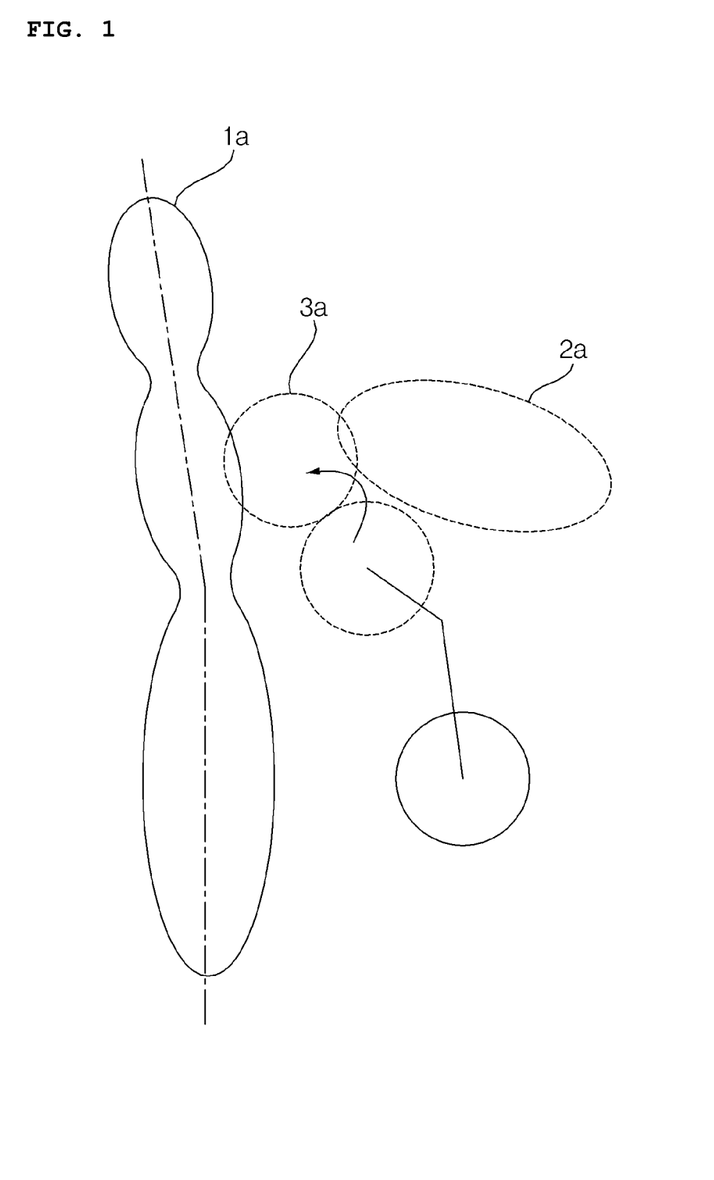
FIG. 1 is a view illustrating a curtain airbag according to the related art when viewed from the top side.

FIG. 1 is a view illustrating a curtain airbag according to the related art when viewed from the top side.

Referring to FIG. 1, a driver airbag 2a is further installed in a steering wheel in the vehicle. In addition, a passenger airbag (not illustrated) for protecting an occupant seated in a front passenger seat is also installed at an upper side of a glove box disposed in front of the front passenger seat in the vehicle.

Typically, the driver airbag 2a and the passenger airbag are deployed at the time of a head-on collision of the vehicle, a curtain airbag 1a is deployed at the time of a broadside collision of the vehicle or at the time of a rollover accident of the vehicle, and the driver airbag 2a, the passenger airbag, and the curtain airbag 1a are deployed at the time of an oblique collision of the vehicle.

When the vehicle collides with an object as described above, the upper body of the occupant is bent forward by inertial force, and a head 3a of the occupant is moved forward. Particularly, at the time of an oblique collision of the vehicle, there are problems in that the head 3a of the occupant obliquely moves forward, passes between the driver airbag 2a and the curtain airbag 1a, and collides with a structure of the vehicle, or passes between the passenger airbag and the curtain airbag 1a, and collides with a structure of the vehicle.

SUMMARY

The present invention has been made in an effort to provide a curtain airbag apparatus capable of preventing a head of an occupant from being moved forward and colliding with a structure of a vehicle at the time of an oblique collision of the vehicle.

Technical problems of the present invention are not limited to the aforementioned technical problem, and other technical problems, which are not mentioned above, may be clearly understood by those skilled in the art from the following descriptions.

An exemplary embodiment of the present invention provides a curtain airbag apparatus including: a curtain airbag which is inflated when gas flows into the curtain airbag; an auxiliary airbag which is coupled to the curtain airbag, is inflated when gas flows into the auxiliary airbag, and protrudes into the interior of a vehicle; and a support panel which is coupled to the curtain airbag and the auxiliary airbag, and supports the protruding auxiliary airbag.

Other detailed matters of the exemplary embodiment are included in the detailed description and the drawings.

According to the curtain airbag apparatus according to the exemplary embodiment of the present invention, when the curtain airbag is deployed, the auxiliary airbag is inflated and protrudes into the interior of the vehicle, and the support panel supports the protruding auxiliary airbag, such that the auxiliary airbag prevents the head of the occupant from being moved forward at the time of an oblique collision of the vehicle, thereby preventing the head of the driver from colliding with a structure of the vehicle after passing between the driver airbag and the curtain airbag, and preventing the head of the passenger from colliding with a structure of the vehicle after passing between the passenger airbag and the curtain airbag.

The effect of the present invention is not limited to the aforementioned effect, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a curtain airbag apparatus according to exemplary embodiments of the present invention will be described with reference to the drawings.

Figure 2:
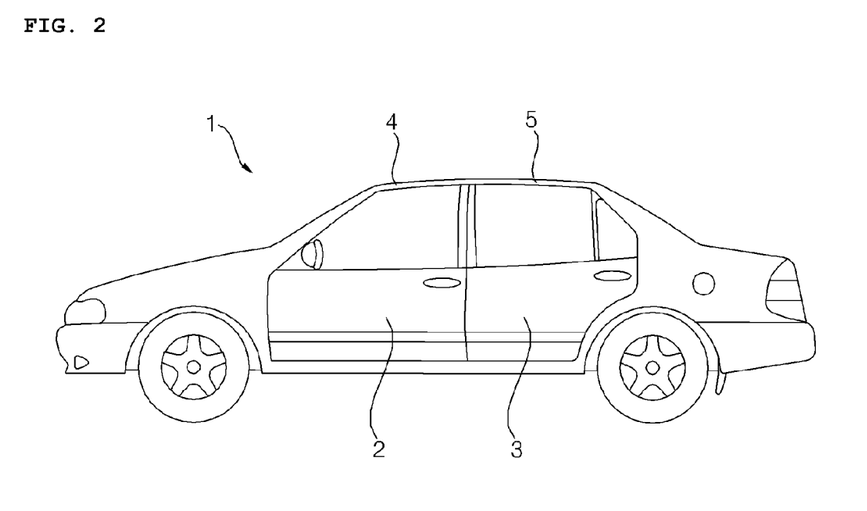
FIG. 2 is a side view illustrating a vehicle in which a curtain airbag apparatus according to a first exemplary embodiment of the present invention is installed.
Figure 3:
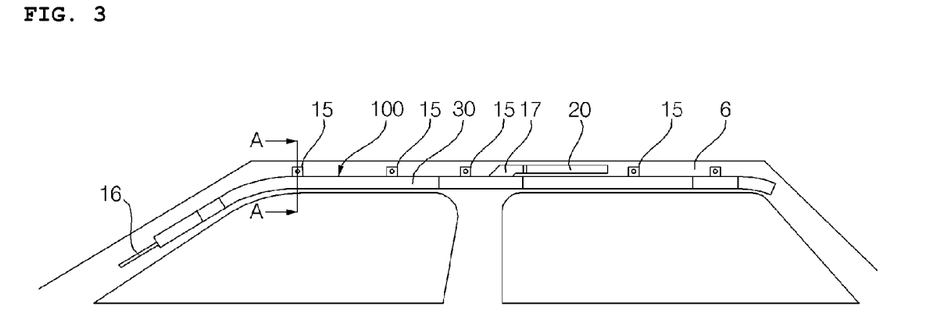
FIG. 3 is a view illustrating a state in which the curtain airbag apparatus according to the first exemplary embodiment of the present invention is installed in the vehicle.
Figure 4:
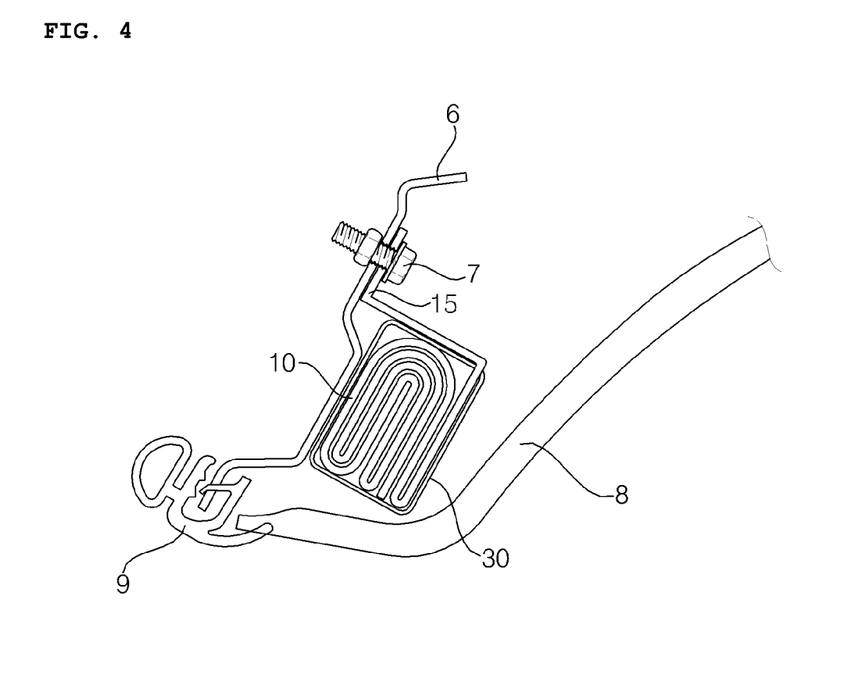
FIG. 4 is a cross-sectional view taken along line A-A of FIG. 3.
Figure 5:
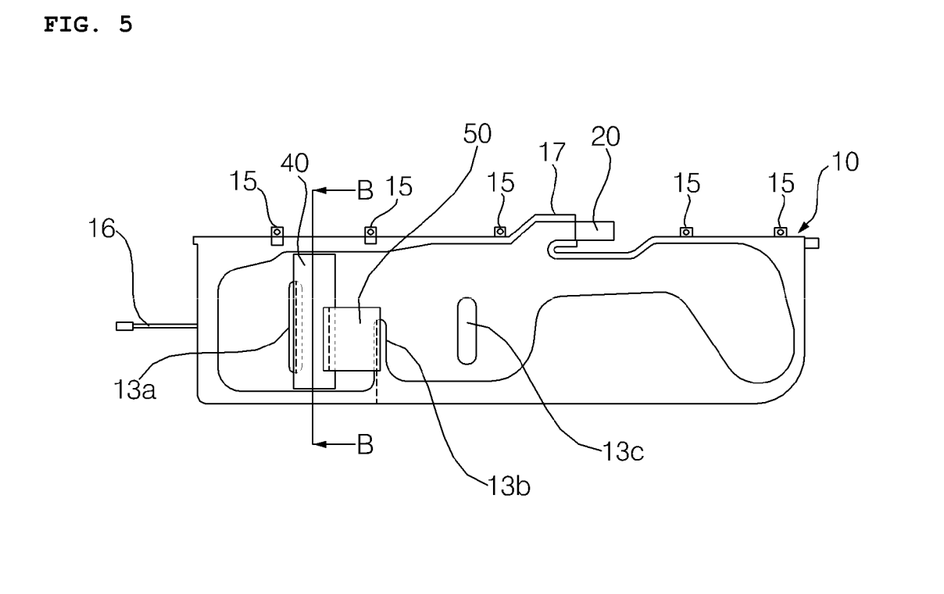
FIG. 5 is a view illustrating a curtain airbag, an auxiliary airbag, and a support panel of the curtain airbag apparatus according to the first exemplary embodiment of the present invention.
Figure 6:
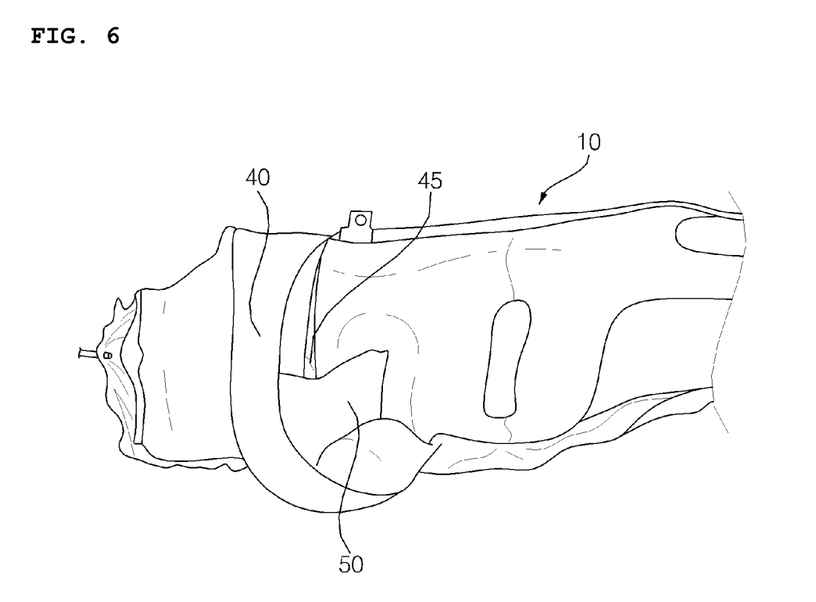
FIG. 6 is a view illustrating a state in which the curtain airbag and the auxiliary airbag in FIG. 5 are inflated.

FIG. 2 is a side view illustrating a vehicle in which a curtain airbag apparatus according to a first exemplary embodiment of the present invention is installed, FIG. 3 is a view illustrating a state in which the curtain airbag apparatus according to the first exemplary embodiment of the present invention is installed in the vehicle, FIG. 4 is a cross-sectional view taken along line A-A of FIG. 3, FIG. 5 is a view illustrating a curtain airbag, an auxiliary airbag, and a support panel of the curtain airbag apparatus according to the first exemplary embodiment of the present invention, and FIG. 6 is a view illustrating a state in which the curtain airbag and the auxiliary airbag in FIG. 5 are inflated.

Referring to FIGS. 1 to 6, a curtain airbag apparatus 100 according to the first exemplary embodiment of the present invention is mounted at an upper side of a vehicle 1 so as to be elongated in a front and rear direction.

A front door 2 and a rear door 3, through which occupants (including both a driver and a passenger) get in and out of the vehicle 1, are provided at a lateral side of the vehicle 1. An A-pillar 4 is disposed at an upper side of the front door 2, a C-pillar 5 is disposed at an upper side of the rear door 3, and a B-pillar (not illustrated) is disposed between the front door 2 and the rear door 3 so as to be elongated in an up and down direction.

The curtain airbag apparatus 100 is mounted on a side inner panel 6, which is disposed inside the A-pillar 4 and the C-pillar 5, so as to be elongated in the front and rear direction. Hereinafter, the side inner panel 6 will be described as a vehicle body 6.

The curtain airbag apparatus 100 includes an inflator 20 which generates gas, and a curtain airbag 10 which is connected with the inflator 20 and inflated and deployed when gas generated by the inflator 20 flows into the curtain airbag 10, to protect a head of the occupant.

The curtain airbag 10 is folded and then encapsulated in a cushion cover 30, and then is mounted on the vehicle body 6, which is disposed inside the A-pillar 4 and the C-pillar 5, by fastening members 7. A plurality of mounting tabs 15, which is mounted on the vehicle body 6 by the fastening members 7, is formed at an upper end of the curtain airbag 10.

The cushion cover 30 may be made of a flexible fabric material identical to a material of the curtain airbag 10. Holes (not illustrated) through which the mounting tabs 15 come out are formed at an upper side of the cushion cover 30, such that the mounting tabs 15 come out through the holes to the outside of the cushion cover 30, and then are mounted on the vehicle body 6 through the fastening members 7. In addition, a tear line (not illustrated), which is torn by expansive force of the curtain airbag 10, is formed at a lower side of the cushion cover 30. That is, the curtain airbag 10 may tear the tear line while being inflated, and then the curtain airbag 10 may be deployed while coming out to the outside of the cushion cover 30.

The curtain airbag apparatus 100 is covered by a head liner 8 such that the curtain airbag apparatus 100 is invisible from the interior of the vehicle. Here, the head liner 8 refers to a member that is made of a fabric material and covers a roof panel (not illustrated) of the vehicle 1 from the interior of the vehicle. The head liner 8 is caught by a weather strip 9 disposed at a lower end of the vehicle body 6, and when the curtain airbag 10 is inflated, the head liner 8 is detached and separated from the weather strip 9 by expansive force of the curtain airbag 10, and the curtain airbag 10 comes out through a gap between the weather strip 9 and the head liner 8 and then is deployed, such that the curtain airbag 10 is disposed between the head of the occupant and the front door 2 and the rear door 3, thereby protecting the head of the occupant.

An A-pillar tether 16, which is fixed to the vehicle body 6 disposed inside the A-pillar 4, is coupled to a front end of the curtain airbag 10. Therefore, a front side of the curtain airbag 10 is restricted by the A-pillar tether 16 when the curtain airbag 10 is inflated, such that the curtain airbag 10 may be deployed without being biased rearward.

Meanwhile, a gas inlet portion 17, which is coupled to the inflator 20, is formed at a center of an upper end of the curtain airbag 10. A tip portion of the inflator 20, through which gas is discharged, is disposed to be inserted into the gas inlet portion 17. The curtain airbag 10 may be inflated and deployed when gas generated by the inflator 20 flows into a chamber of the curtain airbag 10 through the gas inlet portion 17.

A front side of the curtain airbag 10 based on the gas inlet portion 17 is an area that protects an occupant seated in a front seat, and a rear side of the curtain airbag 10 based on the gas inlet portion 17 is an area that protects an occupant seated in a rear seat.

Meanwhile, an auxiliary airbag 40 is coupled to one surface of the curtain airbag 10. The auxiliary airbag 40 is inflated when gas flowing into the curtain airbag 10 flows into the auxiliary airbag 40, and protrudes into the interior of the vehicle. The auxiliary airbag 40 is coupled to the front side of the curtain airbag 10 which is further forward than the gas inlet portion 17.

The auxiliary airbag 40 protrudes into the interior of the vehicle, and blocks a gap between a driver airbag and the curtain airbag 10, or blocks a gap between a passenger airbag and the curtain airbag 10. The auxiliary airbag 40 may be coupled to the curtain airbag 10 at a position corresponding to a position where the driver airbag is fully inflated or a position where the passenger airbag is fully inflated so that the auxiliary airbag 40 may block the gap between the driver airbag and the curtain airbag 10 or the gap between the passenger airbag and the curtain airbag 10.

A plurality of non-expandable portions 13a, 13b, and 13c is formed in the curtain airbag 10 at a position further forward than the gas inlet portion 17. The plurality of non-expandable portions 13a, 13b, and 13c is portions that are not inflated because gas does not flow into the plurality of non-expandable portions 13a, 13b, and 13c. The plurality of non-expandable portions 13a, 13b, and 13c is formed to be spaced apart from each other in the front and rear direction. That is, the plurality of non-expandable portions 13a, 13b, and 13c includes a first non-expandable portion 13a which is disposed at a foremost side, a second non-expandable portion 13b which is disposed to be spaced rearward from the first non-expandable portion 13a, and a third non-expandable portion 13c which is disposed to be spaced rearward from the second non-expandable portion 13b.

The first non-expandable portion 13a is formed to be elongated in the up and down direction, and gas flowing into the curtain airbag 10 passes through upper and lower sides of the first non-expandable portion 13a while being moved forward.

The second non-expandable portion 13b extends from a lower end of the curtain airbag 10 and protrudes upward. An upper end of the second non-expandable portion 13b is disposed to be higher than a lower end of the first non-expandable portion 13a and lower than an upper end of the first non-expandable portion 13a. Gas flowing into the curtain airbag 10 passes only through an upper side of the second non-expandable portion 13b while being moved forward.

The third non-expandable portion 13c is formed to be elongated in the up and down direction. An upper end of the third non-expandable portion 13c is disposed to be lower than the upper end of the first non-expandable portion 13a and higher than the upper end of the second non-expandable portion 13b, and a lower end of the third non-expandable portion 13c is disposed to be higher than the lower end of the first non-expandable portion 13a and lower than the upper end of the second non-expandable portion 13b. Gas flowing into the curtain airbag 10 passes through upper and lower sides of the third non-expandable portion 13c while being moved forward.

The auxiliary airbag 40 is disposed to be elongated in the up and down direction at one surface of the curtain airbag 10, and has upper and lower ends coupled to the one surface of the curtain airbag 10.

At least one of the upper and lower ends of the auxiliary airbag 40 is in communication with an internal space of the curtain airbag 10. In the present exemplary embodiment, both of the upper and lower ends of the auxiliary airbag 40 are in communication with the internal space of the curtain airbag 10. Therefore, the auxiliary airbag 40 is inflated when gas flowing into the internal space of the curtain airbag 10 flows into the auxiliary airbag 40 through the upper and lower ends of the auxiliary airbag 40, such that the auxiliary airbag 40 may protrude into the interior of the vehicle.

In the curtain airbag 10, the second non-expandable portion 13b and the third non-expandable portion 13c, which are not inflated, are formed in a section in the front and rear direction from a portion to which the auxiliary airbag 40 is coupled to a portion where the gas inlet portion 17 is formed. In the curtain airbag 10, only at least one of the second non-expandable portion 13b and the third non-expandable portion 13c may be formed in the section in the front and rear direction from the portion to which the auxiliary airbag 40 is coupled to the portion where the gas inlet portion 17 is formed.

The upper end of the second non-expandable portion 13b and the upper end of the third non-expandable portion 13c are disposed to be lower than the gas inlet portion 17. The upper end of the auxiliary airbag 40 is disposed to be higher than the upper end of the second non-expandable portion 13b and the upper end of the third non-expandable portion 13c, and the lower end of the auxiliary airbag 40 is disposed to be lower than the upper end of the second non-expandable portion 13b. In the present exemplary embodiment, the upper end of the second non-expandable portion 13b is disposed at a position corresponding to an intermediate portion between the upper and lower ends of the auxiliary airbag 40. Gas flowing into the curtain airbag 10 through the gas inlet portion 17 flows in the curtain airbag 10 in the front and rear direction. Gas flowing forward in the curtain airbag 10, from gas flowing in the curtain airbag 10 in the front and rear direction, is moved forward while sequentially passing through the upper end of the third non-expandable portion 13c and the upper end of the second non-expandable portion 13b. However, since the upper end of the second non-expandable portion 13b is disposed at a position corresponding to the intermediate portion between the upper and lower ends of the auxiliary airbag 40, gas passing through the upper end of the second non-expandable portion 13b flows nearly simultaneously into the upper and lower ends of the auxiliary airbag 40, such that the auxiliary airbag 40 may protrude into the interior of the vehicle in a state in which upper and lower portions of the auxiliary airbag 40 are not biased to one side.

When the auxiliary airbag 40 protrudes into the interior of the vehicle as described above, the head of the occupant comes into contact with the auxiliary airbag 40 as the head of the occupant is moved forward by inertial force. Therefore, the head of the occupant is not moved forward any further because of the auxiliary airbag 40, such that the head of the occupant does not enter the gap between the driver airbag and the curtain airbag or the gap between the passenger airbag and the curtain airbag 10.

However, in a case in which force by which the head of the occupant comes into contact with the auxiliary airbag 40 is excessive, the auxiliary airbag 40 is bent forward, and as a result, the head of the occupant is likely to be moved forward. Therefore, a support panel 50, which supports the auxiliary airbag 40, is coupled to the auxiliary airbag 40. The support panel 50 has one end coupled to the auxiliary airbag 40 and the other end coupled to the curtain airbag 10, such that the support panel 50 may support the auxiliary airbag 40 so that the auxiliary airbag 40 is not bent forward.

In particular, in the present exemplary embodiment, since only the upper and lower ends of the auxiliary airbag 40 are coupled to the one surface of the curtain airbag 10, an opened space 45 is formed between the auxiliary airbag 40 and the curtain airbag 10 when the auxiliary airbag 40 protrudes into the interior of the vehicle. Therefore, when the head of the occupant comes into contact with the auxiliary airbag 40, the auxiliary airbag 40 is not only likely to be bent forward, but the head of the occupant is also likely to be trapped into the opened space 45. The support panel 50 shields at least a part of the opened space 45, and has one end coupled to the auxiliary airbag 40 and the other end coupled to the curtain airbag 10, such that the support panel 50 serves to support the auxiliary airbag 40 so that the auxiliary airbag 40 is not bent forward, and serves to prevent the head of the occupant from being trapped into the opened space 45.

The auxiliary airbag 40 and the support panel 50 are disposed at positions further forward than the gas inlet portion 17 of the curtain airbag 10. A front end of the auxiliary airbag 40 is coupled to the first non-expandable portion 13a by sewing. Further, the single support panel 50 is provided, such that a front end of the support panel 50 is coupled to a rear end of the auxiliary airbag 40 by sewing, and a rear end of the support panel 50 is coupled to the second non-expandable portion 13b by sewing.

Figure 7:
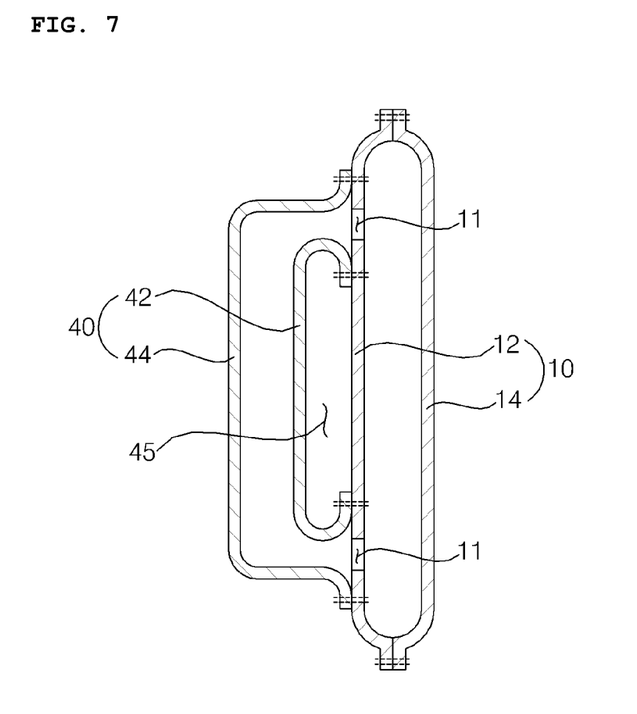
FIG. 7 is a cross-sectional view taken along line B-B of FIG. 5.

FIG. 7 is a cross-sectional view taken along line B-B of FIG. 5.

Referring to FIGS. 5 and 7, the curtain airbag 10 is manufactured by coupling two flexible panels by sewing. That is, the curtain airbag 10 includes an inner board 12, and an outer board 14 that is coupled to the inner board 12. The inner board 12 and the outer board 14 has the same size and structure. The curtain airbag 10 may be completed by spreading out the outer board 14 on a floor, spreading out the inner board 12 and stacking the inner board 12 on the outer board 14, and thereafter sewing circumferences of the inner board 12 and the outer board 14. When gas flows into the curtain airbag 10 and the curtain airbag 10 is deployed, the inner board 12 is disposed to be directed toward the interior of the vehicle, and the outer board 14 is disposed to be directed toward the front door 2 and the rear door 3. That is, the inner board 12 forms the one surface of the curtain airbag 10, and the outer board 14 forms the other surface of the curtain airbag 10.

A vent hole 11 through which gas flowing into the curtain airbag 10 is discharged is formed in the inner board 12. The two vent holes 11 are provided to be disposed in the up and down direction. The upper end of the auxiliary airbag 40 is coupled to the inner board 12 while shielding the upper vent hole 11, and the lower end of the auxiliary airbag 40 is coupled to the inner board 12 while shielding the lower vent hole 11. However, only at least one vent hole 11 may be formed in the inner board 12. For example, only one vent hole 11 may be formed at an upper end higher than the second non-expandable portion 13b. In a case in which only one vent hole 11 is formed at the upper end higher than the second non-expandable portion 13b, the upper end of the auxiliary airbag 40 is coupled to the inner board 12 while shielding the vent hole 11, and in communication with the internal space of the curtain airbag 10, and the lower end of the auxiliary airbag 40 may be coupled to the lower end of the inner board 12, and may not be in communication with the internal space of the curtain airbag 10.

Similar to the curtain airbag 10, the auxiliary airbag 40 is manufactured by using two flexible panels. The auxiliary airbag 40 may be made of the same material as the curtain airbag 10. The auxiliary airbag 40 includes a first panel 42 which is disposed to face the inner board 12, and a second panel 44 which is coupled to the first panel 42 by sewing circumferences of the first and second panels 42 and 44. The second panel 44 is disposed at the opposite side to the inner board 12 and directed toward the interior of the vehicle.

An operation of the curtain airbag apparatus according to the exemplary embodiment of the present invention, which is configured as described above, will be described below.

First, at the time of an accident of the vehicle 1, the inflator 20 generates and discharges gas. Gas discharged from the inflator 20 flows into the curtain airbag 10, and moves in the curtain airbag 10 in the front and rear direction.

Thereafter, a rear portion of the curtain airbag 10 is inflated by gas flowing rearward. At the same time, a front portion of the curtain airbag 10 is also inflated.

Gas flowing forward in the curtain airbag 10 passes through the upper and lower ends of the third non-expandable portion 13c disposed to be closest to the gas inlet portion 17, and then continues to be moved forward while passing through the upper end of the second non-expandable portion 13b.

Thereafter, a part of the gas, which passes through the upper end of the second non-expandable portion 13b, is discharged to the outside of the curtain airbag 10 through the vent hole 11, and the discharged gas flows into the auxiliary airbag 40 through the upper and lower ends of the auxiliary airbag 40, such that the auxiliary airbag 40 begins to be inflated.

Meanwhile, the remaining gas of the gas passing through the upper end of the second non-expandable portion 13b flows into the front side of the curtain airbag 10 while passing through the upper and lower ends of the first non-expandable portion 13a, such that gas completely flows into the front side of the curtain airbag 10.

Since only the upper and lower ends of the auxiliary airbag are coupled to the curtain airbag 10, while the auxiliary airbag 40 is inflated, a center of the auxiliary airbag 40 protrudes into the interior of the vehicle while being spaced apart from the curtain airbag 10. That is, the auxiliary airbag 40 protrudes into the interior of the vehicle while forming the opened space 45 between the auxiliary airbag 40 and the curtain airbag 10, and blocks the gap between the driver airbag and the curtain airbag or the gap between the passenger airbag and the curtain airbag.

Meanwhile, while the auxiliary airbag 40 protrudes into the interior of the vehicle, the support panel 50 is moved along the auxiliary airbag 40 and tightened to support the auxiliary airbag 40 so that the auxiliary airbag 40 is not bent forward. Therefore, the auxiliary airbag 40 is not bent forward even though the head of the occupant comes into contact with the auxiliary airbag 40, such that the head of the occupant is not trapped in the gap between the driver airbag and the curtain airbag 10 or the gap between the passenger airbag and the curtain airbag 10.

Figure 8:
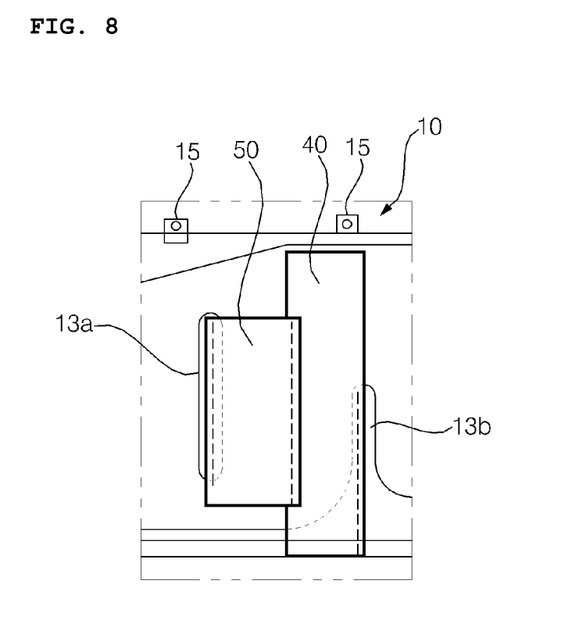
FIG. 8 is a view illustrating a curtain airbag, an auxiliary airbag, and a support panel of a curtain airbag apparatus according to a second exemplary embodiment of the present invention.

FIG. 8 is a view illustrating a curtain airbag, an auxiliary airbag, and a support panel of a curtain airbag apparatus according to a second exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 8, it can be seen that the curtain airbag apparatus according to the second exemplary embodiment of the present invention differs from the curtain airbag apparatus according to the aforementioned first exemplary embodiment. That is, in the aforementioned first exemplary embodiment, the front end of the auxiliary airbag 40 is coupled to the first non-expandable portion 13a, the front end of the support panel 50 is coupled to the rear end of the auxiliary airbag 40, and the rear end of the support panel 50 is coupled to the second non-expandable portion 13b, but in the present second exemplary embodiment, a rear end of the auxiliary airbag 40 is coupled to the second non-expandable portion 13b, a front end of the support panel 50 is coupled to the first non-expandable portion 13a, and a rear end of the support panel 50 is coupled to a front end of the auxiliary airbag 40.

In the present second exemplary embodiment, an upper end of the auxiliary airbag 40 is coupled to the inner board 12 of the curtain airbag 10 so as to be in communication with the inside of the curtain airbag 10, and a lower end of the auxiliary airbag 40 is coupled to a lower end of the inner board 12 so as not to be in communication with the inside of the curtain airbag 10. However, similar to the aforementioned first exemplary embodiment, both of the upper and lower ends of the auxiliary airbag 40 may be coupled to the inner board 12 so as to be in communication with the inside of the curtain airbag 10.

Figure 9:
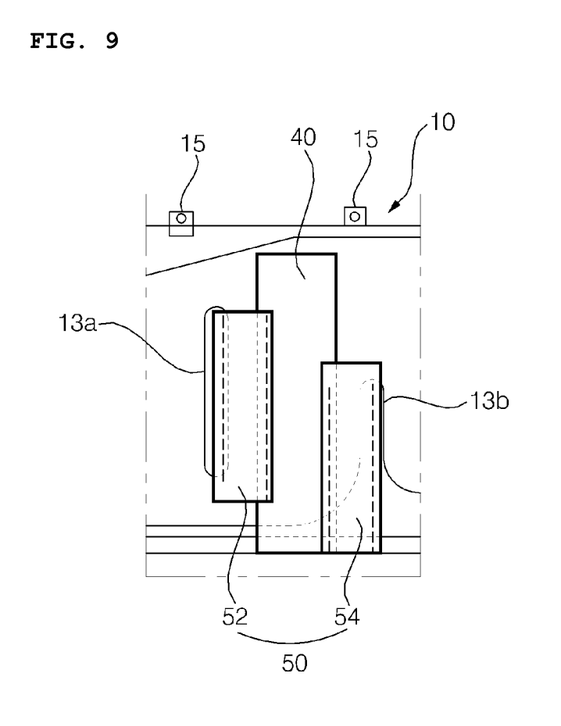
FIG. 9 is a view illustrating a curtain airbag, an auxiliary airbag, and a support panel of a curtain airbag apparatus according to a third exemplary embodiment of the present invention.

FIG. 9 is a view illustrating a curtain airbag, an auxiliary airbag, and a support panel of a curtain airbag apparatus according to a third exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 9, it can be seen that the curtain airbag apparatus according to the third exemplary embodiment of the present invention differs from the curtain airbag apparatus according to the aforementioned first exemplary embodiment. That is, in the aforementioned first exemplary embodiment, the single support panel 50 is provided, but in the present third exemplary embodiment, two support panels 50 are provided and include a first support panel 52, and a second support panel 54.

In the present third exemplary embodiment, the auxiliary airbag 40 is disposed between the first non-expandable portion 13*a* and the second non-expandable portion 13*b*. Further, a front end of the first support panel 52 is coupled to the first non-expandable portion 13*a*, and a rear end of the first support panel 52 is coupled to a front end of the auxiliary airbag 40. Further, a front end of the second support panel 54 is coupled to a rear end of the auxiliary airbag 40, and a rear end of the second support panel 54 is coupled to the second non-expandable portion 13*b*.

In the present third exemplary embodiment, an upper end of the auxiliary airbag 40 is coupled to the inner board 12 of the curtain airbag 10 so as to be in communication with the inside of the curtain airbag 10, and a lower end of the auxiliary airbag 40 is coupled to a lower end of the inner board 12 so as not to be in communication with the inside of the curtain airbag 10. However, similar to the aforementioned first exemplary embodiment, both of the upper and lower ends of the auxiliary airbag 40 may be coupled to the inner board 12 so as to be in communication with the inside of the curtain airbag 10.

As described above, according to the curtain airbag apparatus according to the exemplary embodiment of the present invention, when the curtain airbag 10 is deployed, the auxiliary airbag 40 is inflated and protrudes into the interior of the vehicle, and the support panel 50 supports the protruding auxiliary airbag 40, such that the auxiliary airbag 40 prevents the head of the occupant from being moved forward at the time of an oblique collision of the vehicle, thereby preventing the head of the driver from colliding with a structure of the vehicle 1 after passing between the driver airbag and the curtain airbag 10, and preventing the head of the passenger from colliding with a structure of the vehicle 1 after passing between the passenger airbag and the curtain airbag 10.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A curtain airbag apparatus comprising:
   a curtain airbag which is inflated when gas flows into the curtain airbag;
   an auxiliary airbag which is coupled and fixed to the curtain airbag by sewing, is inflated when gas flows into the auxiliary airbag, and protrudes into the interior of a vehicle; and
   a support panel which is coupled and fixed to both of the curtain airbag and the auxiliary airbag by sewing, and supports the protruding auxiliary airbag such that the protruding auxiliary airbag is prevented from being bent forward in a direction facing a front of a vehicle,
   wherein the auxiliary airbag protrudes into the interior of the vehicle while forming an opening between the auxiliary airbag and the curtain airbag, and includes:
   an upper end sewed on the curtain airbag;
   a lower end sewed on the curtain airbag; and
   a middle portion formed between the upper end and the lower end and spaced apart from the curtain airbag such that the opening passing through the middle portion in a longitudinal direction of the curtain airbag is formed between the curtain airbag and the auxiliary airbag.

2. The curtain airbag apparatus of claim 1, wherein the support panel shields at least a part of the opening.

3. The curtain airbag apparatus of claim 1, wherein at least one of the upper and lower ends of the auxiliary airbag is in communication with an inside of the curtain airbag.

4. The curtain airbag apparatus of claim 3, wherein the curtain airbag includes an inner board which forms a first surface which faces the interior of the vehicle, and an outer board which is coupled to the inner board and forms a second surface opposite to the first surface, at least one vent hole through which gas is discharged is formed in the inner board, and at least one of the upper and lower ends of the auxiliary airbag is coupled to the inner board while shielding the at least one vent hole.

5. The curtain airbag apparatus of claim 1, wherein the curtain airbag includes an inner board which forms a first surface which faces the interior of the vehicle, and an outer board which is coupled to the inner board and forms a second surface opposite to the first surface,
   wherein the auxiliary airbag includes a first panel which is disposed to face the inner board, and a second panel which is coupled to the first panel and disposed at the opposite side to the inner board.

6. The curtain airbag apparatus of claim 1, wherein a gas inlet portion through which gas flows in is formed in the curtain airbag, and the auxiliary airbag and the support panel are disposed further forward than the gas inlet portion.

7. The curtain airbag apparatus of claim 1, wherein the auxiliary airbag is coupled to a position corresponding to a position where a driver airbag is inflated or a position corresponding to a position where a passenger airbag is inflated.

8. The curtain airbag apparatus of claim 1, wherein a first non-expandable portion, which is not inflated, and a second non-expandable portion, which is spaced rearward from the first non-expandable portion and is not inflated, are formed at a front portion of the curtain airbag, a front end of the auxiliary airbag is coupled to the first non-expandable portion, a front end of the support panel is coupled to a rear end of the auxiliary airbag, and a rear end of the support panel is coupled to the second non-expandable portion.

9. The curtain airbag apparatus of claim 1, wherein a first non-expandable portion, which is not inflated, and a second non-expandable portion, which is spaced rearward from the first non-expandable portion and is not inflated, are formed at a front portion of the curtain airbag, a rear end of the auxiliary airbag is coupled to the second non-expandable portion, a front end of the support panel is coupled to the first non-expandable portion, and a rear end of the support panel is coupled to a front end of the auxiliary airbag.

10. The curtain airbag apparatus of claim 1, wherein a first non-expandable portion, which is not inflated, and a second non-expandable portion, which is spaced rearward from the first non-expandable portion and is not inflated, are formed at a front portion of the curtain airbag, the auxiliary airbag is disposed between the first non-expandable portion and the second non-expandable portion, and
   the support panel includes:
   a first support panel which has a front end coupled and fixed to the first non-expandable portion by sewing, and a rear end coupled and fixed to a front end of the auxiliary airbag by sewing; and a second support panel which has a front end coupled and fixed to a rear end of the auxiliary airbag by sewing, and a rear end coupled and fixed to the second non-expandable portion by sewing.

11. The curtain airbag apparatus of claim 1, wherein the auxiliary airbag is disposed in a vertical direction between a fore end of the curtain airbag and an inflator coupled to the curtain airbag.

12. The curtain airbag apparatus of claim 1, wherein the upper and lower ends of the auxiliary airbag are sewed to a first surface of the curtain airbag which faces the interior of the vehicle.

13. The curtain airbag apparatus of claim 1, wherein the auxiliary airbag includes a pair of panels formed separate from the curtain airbag and sewed to the curtain airbag.

* * * * *